(12) United States Patent
Dharmatilleke

(10) Patent No.: US 7,764,436 B2
(45) Date of Patent: Jul. 27, 2010

(54) DEVICE AND METHOD TO REALIZE A LIGHT PROCESSOR

(75) Inventor: Saman Dharmatilleke, Singapore (SG)

(73) Assignee: Agency for Science, Technology and Research, Centros (SG)

( * ) Notice: Subject to any disclaimer, the term of this patent is extended or adjusted under 35 U.S.C. 154(b) by 0 days.

(21) Appl. No.: 11/936,615

(22) Filed: Nov. 7, 2007

(65) Prior Publication Data

US 2008/0266645 A1   Oct. 30, 2008

Related U.S. Application Data

(60) Provisional application No. 60/857,605, filed on Nov. 7, 2006.

(51) Int. Cl.
  *G02B 1/06* (2006.01)
  *G02B 5/08* (2006.01)
(52) U.S. Cl. .................. 359/665; 359/846
(58) Field of Classification Search .......... 359/665, 359/666, 846
See application file for complete search history.

(56) References Cited

U.S. PATENT DOCUMENTS

| | | | |
|---|---|---|---|
| 4,989,958 A | 2/1991 | Hamada et al. | |
| 5,223,823 A | 6/1993 | Disanto et al. | |
| 6,583,921 B2 | 6/2003 | Nelson | |
| 7,515,349 B2 * | 4/2009 | Dobrusskin et al. | 359/665 |
| 2001/0053016 A1 | 12/2001 | Nelson | |

FOREIGN PATENT DOCUMENTS

| | | |
|---|---|---|
| DE | 10 2004 052 492 A1 | 5/2006 |
| WO | WO 2004/102251 A1 | 11/2004 |
| WO | WO 2006/027746 A1 | 3/2006 |
| WO | WO 2006/075279 A1 | 7/2006 |

* cited by examiner

*Primary Examiner*—William C Choi
(74) *Attorney, Agent, or Firm*—Townsend and Townsend and Crew LLP

(57) ABSTRACT

A device for light processing includes a first housing having a reflective bottom surface and walls defining a first cavity. A first fluid or gel has a meniscus disposed within the first cavity. A control means is coupled with the first fluid or gel for adjusting the curvature of the meniscus. The bottom surface is configured to reflect an incident light beam through the first fluid or gel and toward the meniscus.

40 Claims, 6 Drawing Sheets

DEVICE AND METHOD TO REALIZE A LIGHT PROCESSOR

CROSS-REFERENCES TO RELATED APPLICATIONS

This application claims the priority to U.S. Provisional Patent Application No. 60/857,605, filed Nov. 7, 2006, which is hereby incorporated by reference in its entirety for all purposes.

BACKGROUND OF THE INVENTION

The present invention relates to light processors and more specifically to digital light processors that eliminate the need for micro-mirror devices.

Space light modulators are transducers that modulate incident light in a spatial pattern corresponding to an electrical or optical input. The incident light may be modulated in its phase, intensity, polarization, or direction, and the light modulation may be achieved by using elements made of a variety of materials exhibiting various electro-optic or magneto-optic effects and by materials that modulate light by surface deformation.

Digital light processors (DLP) are light modulators suitable for various applications such as displays, projectors, televisions, monitors and printing. DLP devices use movable micro-mirrors to direct light into a projector lens, which focuses and magnifies the modulated light from each micro-mirror onto a display screen to produce an image. Since each micro-mirror represents a pixel of light or an image, a DLP device typically consists of a high density array of micro-mirrors on a single-chip integrated circuit. Each micro-mirror rotates about a fixed axis to cause light to be controllably deflected by the rotation. Thus, in some applications, an array of such micro-mirrors can be positioned so that the individual mirrors making up pixels are selectively rotated to create patterns for various purposes.

FIG. 1 shows two DLP cells with mirrors 100 and 102 on the top surface of each cell. Each mirror is attached to an underlying yoke that rotates on a torsion hinge, until the landing tips of the yoke contact the underlying landing pad sites. The micro-mirrors are tilted to reflect light onto and away from the projection screen, as desired. The tilting of the hinged mirrors as shown may be achieved by electro-static actuation.

However, one problem with conventional DLP devices is the problem of stuck mirrors, where the landing tips are slow to lift from the pads or become permanently stuck to the pads. This 'sticking problem' is an important consideration for reliable performance, since it is the most frequent cause of device failure. Sources of the sticking problem may include moisture in the package, scrubbing of landing tips onto the metal landing pads, and outgassing of the epoxy sealants used in the manufacturing process for mounting the devices in their packages.

Solutions to the sticking problem have included applying lubrication or a passivation layer to the metal surfaces, using resonant reset methods to pump energy into the pixel element to help free it from the surface, and adding gettering material to absorb moisture within the package. More recently, 'spring-tips' have been added to the tips of the mirrors. U.S. Pat. No. 6,583,921 addresses the problem by using a non-contacting hinge geometry that eliminates physical contact between the mirrors and the landing pads.

However, the above solutions fail to address other problems. For example, the hinge itself may become damaged or defective. Moreover, some of the above solutions suffer from long-term degradation of the passivant, which could drive the technology to require hermetic packages and complex process steps. Other problems that remain unaddressed include heating of the chip and difficult thermal management of the micro-mirrors, which must be cooled. An additional problem is the "pixel effect" or background noise characterized by stray points of light appearing on the display screen. The pixel effect may typically be reduced by blurring the image so that the pixels surrounding the noise pixels are blended.

Thus, it is desirable to provide systems and methods that overcome the above and other problems. In particular, there is a need for a DLP device that eliminates problems such as stuck mirrors and the pixel effect, while minimizing processing complexity and fabrication steps.

BRIEF SUMMARY OF THE INVENTION

The present invention provides a fluid or gel-based light processing system that overcomes the above problems. In particular, the present invention provides methods and systems for digital light processing for TVs, projectors, and other displays that eliminates the use of mechanical micro-mirrors.

According to one embodiment of the invention, a device for light processing includes a first housing having a reflective bottom surface and walls defining a first cavity. A first fluid or gel has a meniscus disposed within the first cavity. A control means is coupled with the first fluid or gel for adjusting the curvature of the meniscus. The bottom surface is configured to reflect an incident light beam through the first fluid or gel and toward the meniscus.

In one aspect, adjusting the curvature to above a critical curvature causes the meniscus of the first fluid or gel to deflect the reflected incident light to the bottom surface or the side walls of the cavity.

In another aspect, adjusting the curvature to below a critical curvature allows the reflected incident light to refract onto a surface outside of the housing.

According to another embodiment of the invention, a device includes a plurality of cavities, each having a reflective bottom surface. A fluid or gel having a meniscus is disposed within each cavity. A control means is coupled with the fluid or gel for adjusting the curvature of the meniscus disposed within each cavity, wherein the bottom surface is configured to reflect an incident light beam through the fluid or gel and onto an outside surface.

In one aspect, the plurality of cavities is provided by porous silicon.

In another aspect, the plurality of cavities is coupled with a multi-channel structure that is further coupled with a fluid or gel reservoir.

According to another embodiment of the invention, a method of manipulating light includes providing a fluid or gel within a housing that includes a bottom surface and a cavity, wherein the fluid or gel forms a meniscus disposed within the cavity. An incident light beam is focused to the bottom surface of the cavity, wherein the light beam reflects from the bottom surface to the meniscus. The curvature of the meniscus is adjusted so that the light refracts out of the cavity or reflects into the cavity.

In one aspect, the curvature of the meniscus is adjusted so that light refracting out of the cavity occurs when the curvature remains below a critical curvature.

In another aspect, the curvature of the meniscus is adjusted so that light deflecting into the cavity occurs when the curvature exceeds a critical curvature, wherein the incident light beam forms an incident angle that is larger than a critical angle for total internal reflection.

According to another embodiment of the invention, a method of manipulating light in a light processor without movable mirrors includes providing a fluid or gel within a housing that includes a reflective bottom surface and a cavity, wherein the fluid or gel forms a meniscus disposed within the cavity. An incident light beam is focused to the bottom surface of the cavity. The curvature of the meniscus is adjusted to manipulate the reflection of incident light.

In one aspect, adjusting includes adjusting the curvature of the meniscus to remain below a critical curvature so that a pixel of light turns on.

In another aspect, adjusting includes adjusting the curvature of the meniscus to exceed a critical curvature so that a pixel of light turns off.

According to another embodiment of the invention, a device for light processing includes a first housing having a reflective bottom surface and walls defining a first cavity. A first electro-active or conductive material has a meniscus disposed within the first cavity. A control means is coupled with the first electro-active or conductive material for adjusting the curvature of the meniscus. The bottom surface is configured to reflect an incident light beam through the first electro-active material and toward the meniscus.

In one aspect, the electro-active or conductive material is a fluid.

In another aspect, the electro-active or conductive material is a gel.

In another aspect, the curvature of the meniscus is adjusted by changing a contact angle formed by the electro-active or conductive material with the dielectric material on the walls of the cavity.

According to another embodiment of the invention, a light processor uses total internal reflection of light to control transmission, refraction or reflection of light.

According to another embodiment of the invention, a light processor uses total internal reflection and/or refraction and/or reflection of light to control the transmission, refraction or reflection of light in a device.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

FIG. 1B shows two DLP cells with the left pixel turned off and the right pixel turned on.

FIG. 6B shows a liquid or gel-based DLP pixel setup with a pixel turned on.

DETAILED DESCRIPTION OF THE INVENTION

A source of light directed at a conventional DLP array is typically reflected in one of two directions for each micromirror, or pixel. In one direction, the pixel is "off" so that incident light directed upon the mirror will be deflected to a light absorber. In the other direction, the pixel is in the "on" position, so that light incident to that pixel will be reflected to a projector lens. The projector lens then focuses and magnifies the modulated light from the pixel onto a display screen, or to a photosensitive element of a printer. If each pixel of the array is in the "on" position for the case of a display, the displayed image will be an array of bright spots or areas.

Figure 1A:
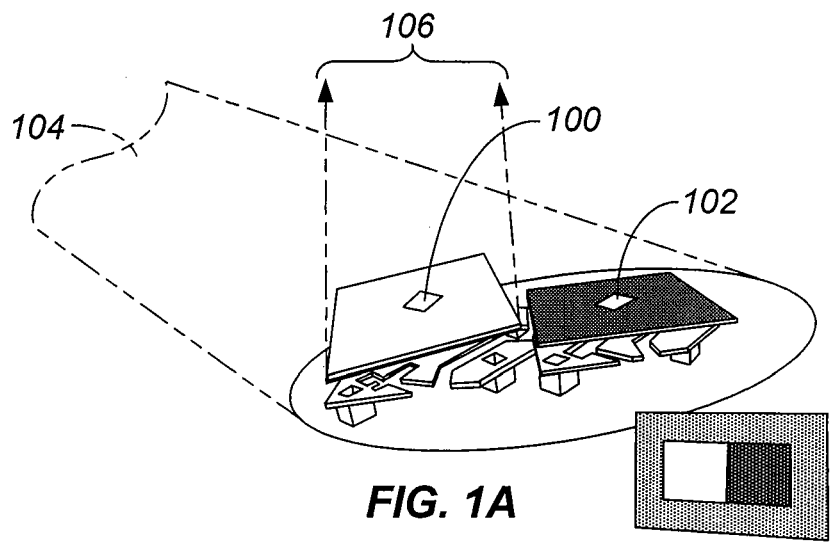
FIG. 1A shows two DLP cells with the left pixel turned on and the right pixel turned off.
Figure 1B:
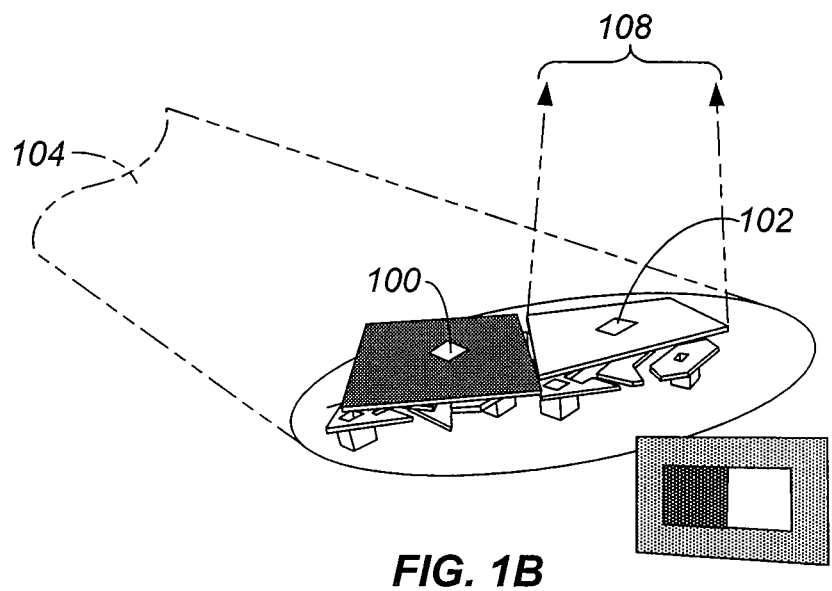

FIGS. 1A and 1B show two pixels of a conventional DLP chip in the "on" and "off" modes. FIG. 1A shows two DLP cells with the left pixel 100 turned on and the right pixel 102 turned off. Incident light 104 hits both pixels, but only left pixel 100 reflects back light 106 to a projector lens, while right pixel 102 remains dark. In contrast, FIG. 1B shows two DLP cells with left pixel 100 turned off and right pixel 102 turned on. Here, only right pixel 102 reflects incident light 104 as reflected light 108. Each micro-mirror, or pixel, of the conventional DLP array is individually controlled in such a way to either reflect incident light onto the projector lens or to deflect it to the light absorber.

Figure 2:
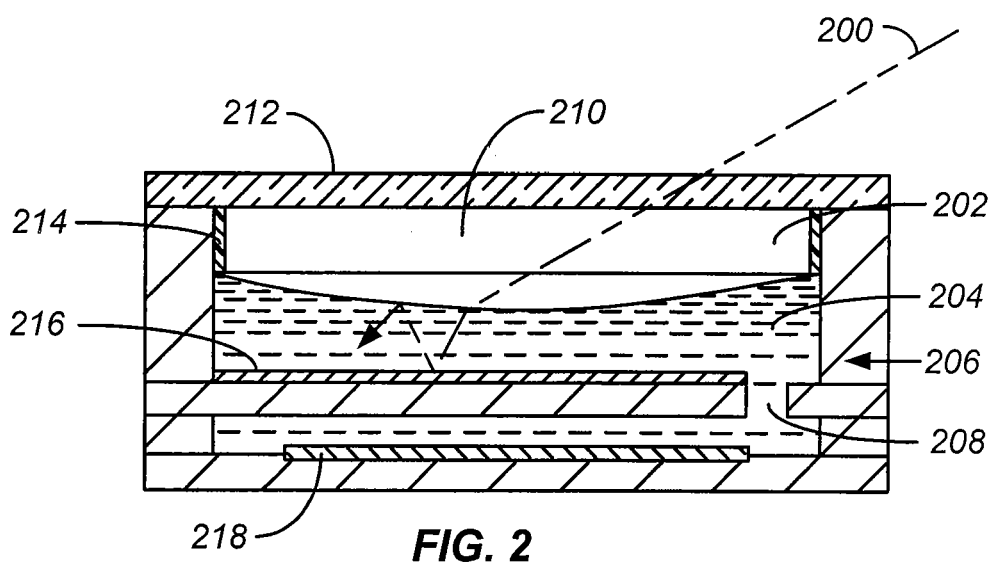
FIG. 2 shows a cross section of a liquid or gel-based DLP device according to an embodiment of the invention.

FIG. 2 shows an exemplary embodiment of the invention. The embodiment shown in FIG. 1 utilized the geometry of each micro-mirror to reflect or deflect light. However, the device shown in FIG. 2 eliminates the use of mirrors completely, and uses instead a cavity 202 that is partially filled with a liquid or gel 204 (i.e., one or more droplets). The liquid may be water or any other suitable fluid. The gel may be an elastomer or other polymer or monomer blends. In other embodiments, the liquid or gel 204 may be replaced by any suitable electro-active or conductive material that is not limited to liquids or gels. Thus, instead of relying on mechanical parts, the resulting system is a liquid or gel-based DLP system (L/G-DLP) and uses the occurrence of 'total internal reflection' of incident light beam 200 to control and manipulate light, as discussed further below.

In one aspect, the top of cavity 202 is sealed with a transparent cover 212, preferably having a non-reflective coating, so that incident light 200 may pass through the cover and liquid or gel 204. Non-reflective coatings include various thin films or spin-on coatings. In one aspect, the bottom of microcavity 202 includes a highly reflective substrate 216, so that incident light 200 may be reflected to the display screen from the device when in the "on" position. Reflective substrates can include substrates coated by reflective thin films such as silver, aluminum, etc. Part of cavity 202 is coated with a hydrophobic material 214. The boundary at the hydrophobic regions constrains the liquid or gel and presents a meniscus having a curvature defined in part by the contact angle at the boundary. The hydrophobic material may be a material such as plastic, polymers, ceramics, alloys, or a fluoropolymer such as Teflon, CYTOP or zirconium oxynitride. In one aspect, the DLP system also includes a micro-via 208 and a piezoelectric diaphragm 218 to control the curvature of the lens and the reflection of light. An air gap 210 lies between the top cover 212 and liquid or gel 204.

Figure 3:
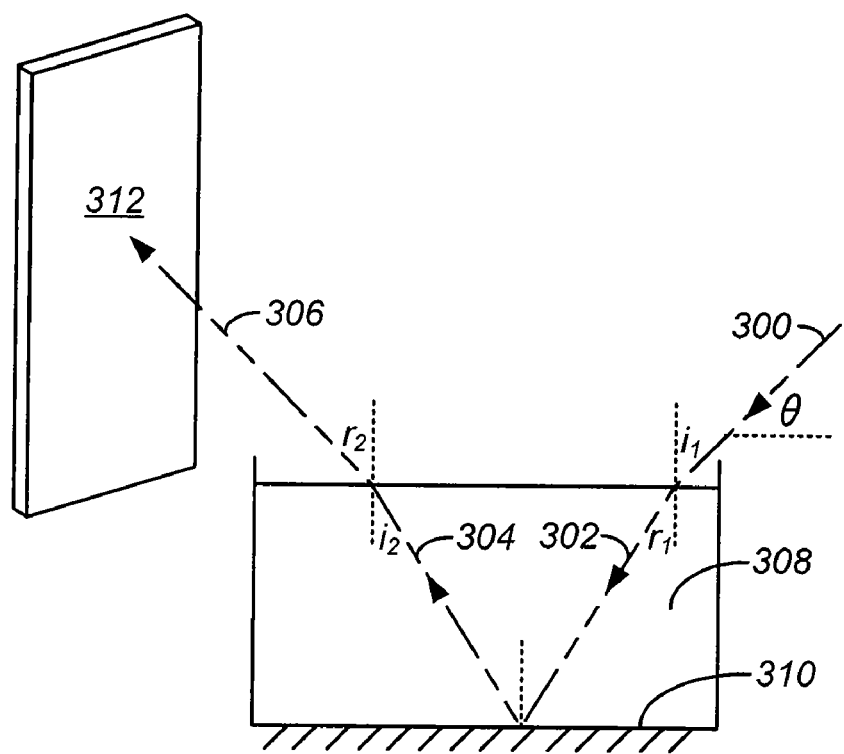
FIG. 3 shows a simplified cross section of a liquid or gel-based DLP with a light beam projected onto a screen with the liquid or gel-based pixel in the "on" position, according to an embodiment of the invention.
Figure 4:
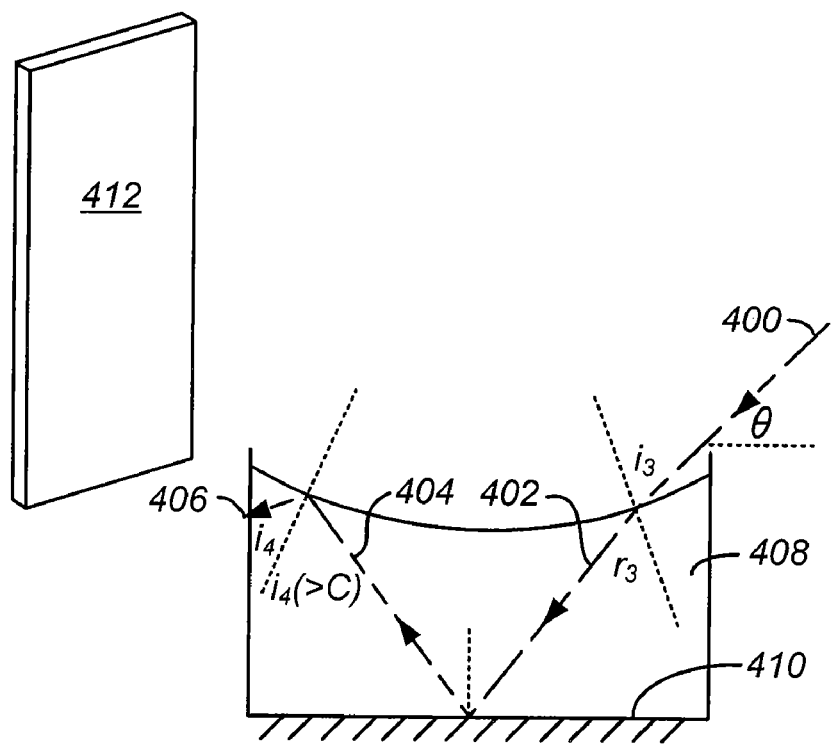
FIG. 4 shows a simplified cross section of a liquid or gel-based DLP with a light beam not being projected onto a screen with the liquid or gel-based pixel in the "off" position, according to an embodiment of the invention.

FIGS. 3 and 4 show incident light beams for the liquid or gel-based DLP system of FIG. 2 in the two possible positions described. A beam of light is focused at the liquid/gel pixel or lens mirror in such a way to fulfill one of two criteria that determines whether the pixel is in the "on" or "off" position. For the "on" position, as shown in FIG. 3, the angle i2 is less than a critical angle C, and for the "off" position as shown in FIG. 4, the angle i4 is greater than the critical angle C.

FIG. 3 shows light beam 300 projected onto a projection screen 312 with the pixel in the "on" position. The angle i2 is less than the critical angle C when the liquid or gel meniscus of the L/G-DLP pixel has a minimum curvature. When incident light beam 300 enters the L/G-DLP cavity 308 filled with a liquid or a gel, the light beam is refracted to follow path 302 in the liquid or gel. When the light beam hits the bottom reflective surface 310, it is then reflected onto path 304, and refracted outside the liquid or gel onto path 306 until it hits projection screen 312.

In contrast, FIG. 4 shows a light beam prevented from being projected onto a screen, with the pixel in the "off" position. FIG. 4 shows that the angle i4 is greater than the critical angle C when the meniscus of the liquid/gel pixel has a large curvature, or is concave. In this case, when incident light beam 400 passes into liquid/gel cavity 408 filled with a liquid or a gel, the beam is refracted into the path 402. When the beam hits the bottom reflective surface 410, it is reflected onto path 404. In this case, however, the beam is deflected back into cavity 408 on path 406, thus prevented from being projected onto projection screen 412. The deflection occurs as a result of the curvature of the liquid or gel meniscus and is due to 'total internal reflection.' As shown in FIG. 4, a large enough curvature in the meniscus would change the angle of incidence of the reflected beam 404 sufficiently so that the angle of incidence on the meniscus is greater than the critical angle (i4>C). Thus, light is reflected back at the meniscus (i.e., gas-liquid or gas-gel interface) after a minimum curvature of the meniscus is exceeded.

The radius of curvature of the liquid or gel meniscus thus forms the optics of the L/G-DLP pixel. Changes in the curvature of the liquid or gel meniscus from flat to concave may be caused by the use of an actuator, such as a piezoelectric actuator, artificial muscle, or shape memory actuator. Other actuating means include a voice coil pump, piezoelectric pump, motor-drive pump, mechanical pump, electrical pump, electro-mechanical pump, or any other suitable actuator or pump as known in the art. Since the actuating means causes shifts in the curvature of the meniscus that determine the occurrence of 'total internal reflection' of light, it thus controls the "on" or "off" positions of each pixel.

Figure 5:
FIG. 5 shows an array of micro cavities to be used for fabrication of liquid or gel-based DLP pixel array according to an embodiment of the invention.

FIG. 5 shows another embodiment of a device according to the invention. In the device of FIG. 5, the pixels are formed by allowing coherent porous silicon, or another suitable porous material, to provide an array of cavities 500. The use of coherent porous silicon enables the fabrication of very small pixels (i.e., 5 µm in diameter) as well as large pixels, depending on the application.

Figure 6A:
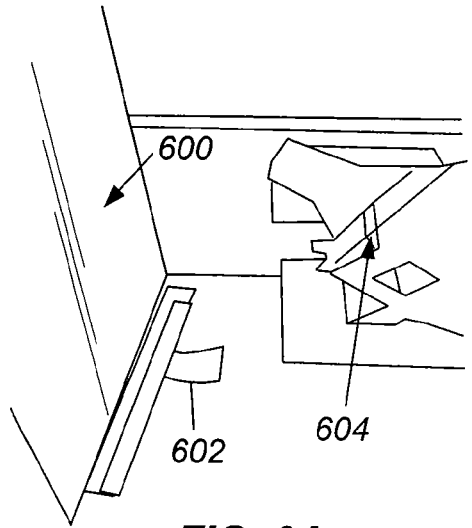
FIG. 6A shows a liquid or gel-based DLP pixel setup according to an embodiment of the invention.
Figure 6B:
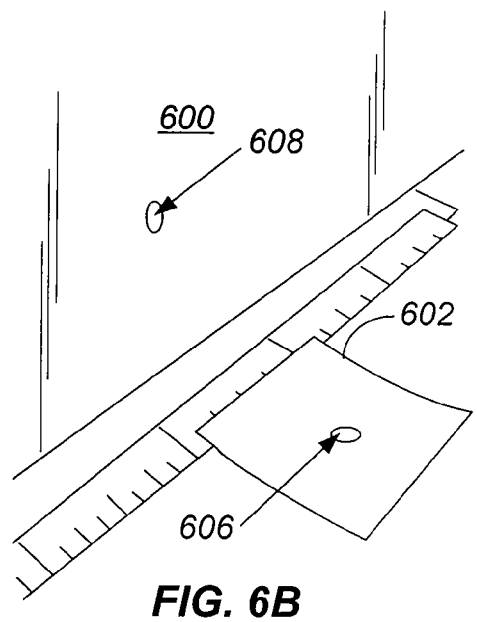
Figure 6C:
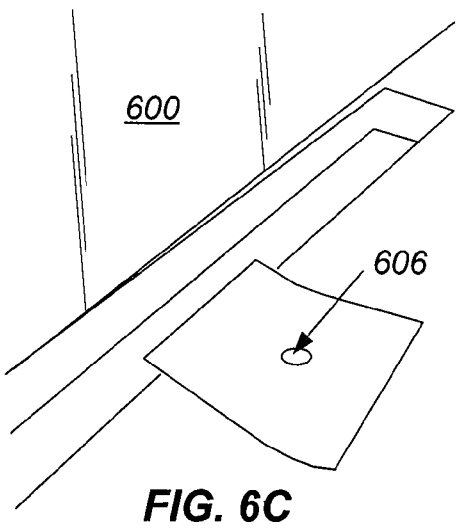
FIG. 6C shows a liquid or gel-based DLP pixel setup with a pixel turned off.

FIGS. 6A-6C show a single pixel being turned on and off in an experimental setup of an embodiment of the invention. FIG. 6A shows the setup including a projection screen 600, a substrate 602, which includes a single L/G DLP-pixel and a light source 604. FIG. 6B shows a light beam originating from the light source (not shown) reflecting light from cavity 606 into spot 608 on projection screen 600, when the pixel is turned "on." FIG. 6C in contrast shows the pixel in the "off" position. As in FIG. 6B, an incident light beam is directed at the liquid/gel-based DLP at 606. However, unlike in FIG. 6B, the light beam is not reflected onto projection screen 600 due to the occurrence of 'total internal reflection' at the interface of gas-liquid or gas-gel, in the L/G-DLP pixel.

Figure 7:
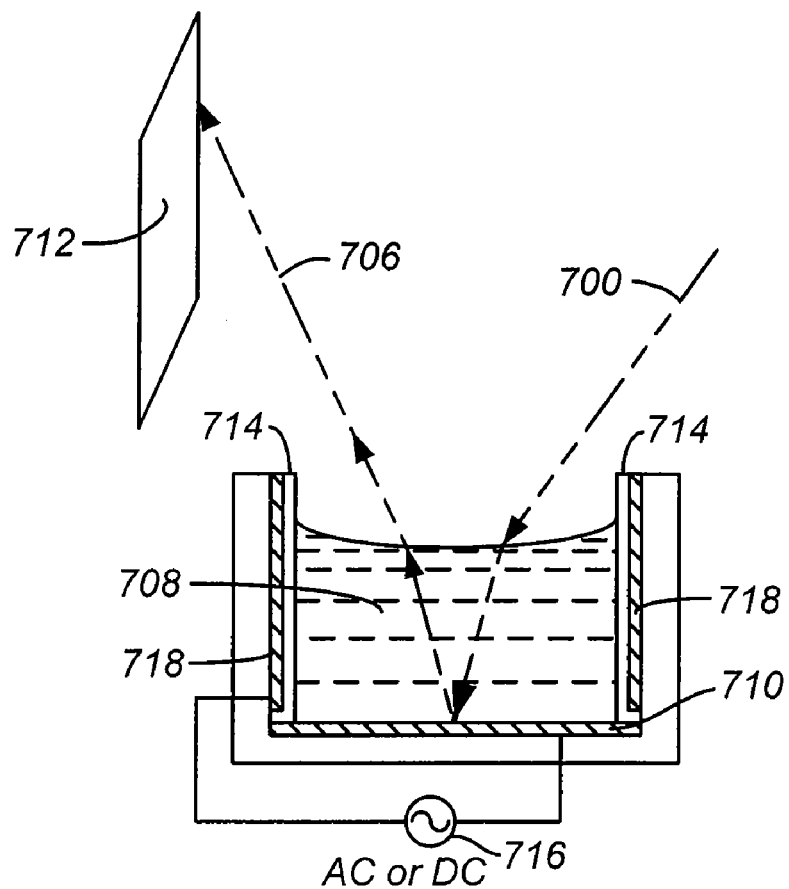
FIG. 7 shows a liquid or gel-based DLP system according to an embodiment of the invention.

FIG. 7 shows a L/G-DLP system according to another embodiment of the invention. As described above, beam 700 enters liquid or gel 708 and is focused onto the reflective surface 710. The beam is reflected to the display screen 712 on path 706 when the L/G-DLP is in the "on" position. In one aspect, liquid or gel 708 is conductive and in contact with power source 716 and conductive electrode 718. Liquid or gel 708 may include any suitable conductive material not limited to liquids or gels. Application of a voltage from power source 716 will change the shape of the meniscus and thus change the value of i4, which determines the refraction or 'total internal reflection' of the light beam. The hydrophobic regions that constrain the conductive liquid or gel to provide for the meniscus are dielectric coatings 714.

Figure 8:
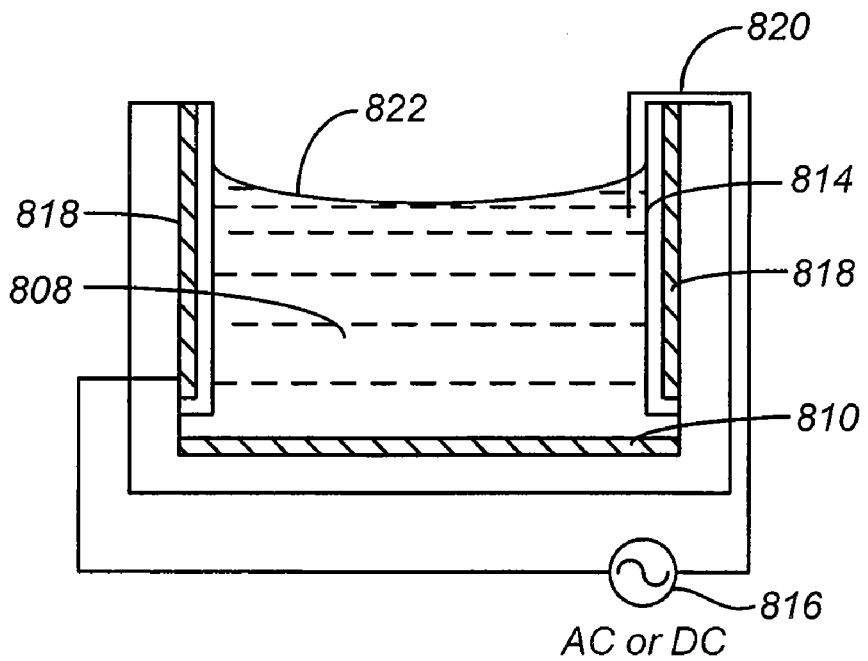
FIG. 8 shows a liquid or gel-based DLP system according to another embodiment of the invention.

FIG. 8 shows an L/G-DLP system according to another embodiment of the invention that includes a conductive liquid or gel 808. As for the embodiment above, a conductive electrode 818 is coupled with a power source 816. A second conductive electrode may be provided, as shown by electrode 820 in FIG. 8. Alternatively, as shown in FIG. 7, the reflective surface 810 may also be used as a second electrode. FIG. 8 also shows dielectric coatings 814 that provide for hydrophobic regions to constrain the conductive liquid or gel. The applied voltage from power source 816 may be AC or DC depending on the application to change the shape of meniscus 822.

Figure 9:
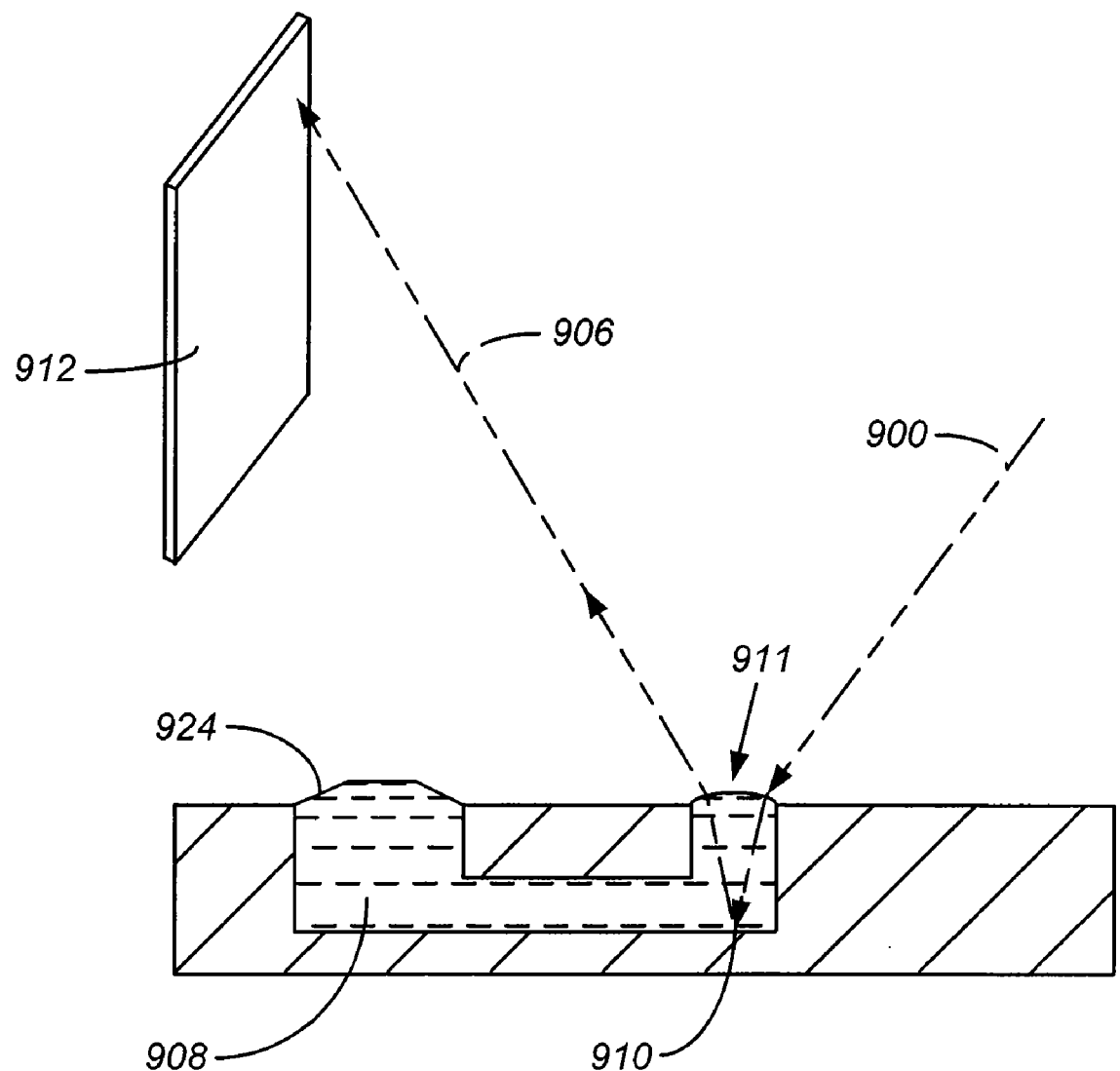
FIG. 9 shows a liquid or gel-based DLP system according to another embodiment of the invention.

FIG. 9 shows an L/G-DLP system according to another embodiment of the invention. As for the embodiments above, light beam 900 is focused onto reflective surface 910 and reflected onto path 906 until it hits display screen 912 when the L/G-DLP is in the "on" position. The L/G-DLP system includes an actuating means 924, which pumps liquid or gel 908 into the cavity of the L/G-DLP as shown. Actuating means 924 may include any of the various actuators or pumps as noted above, to change the curvature of the meniscus 911 of liquid/gel 908.

Figure 10:
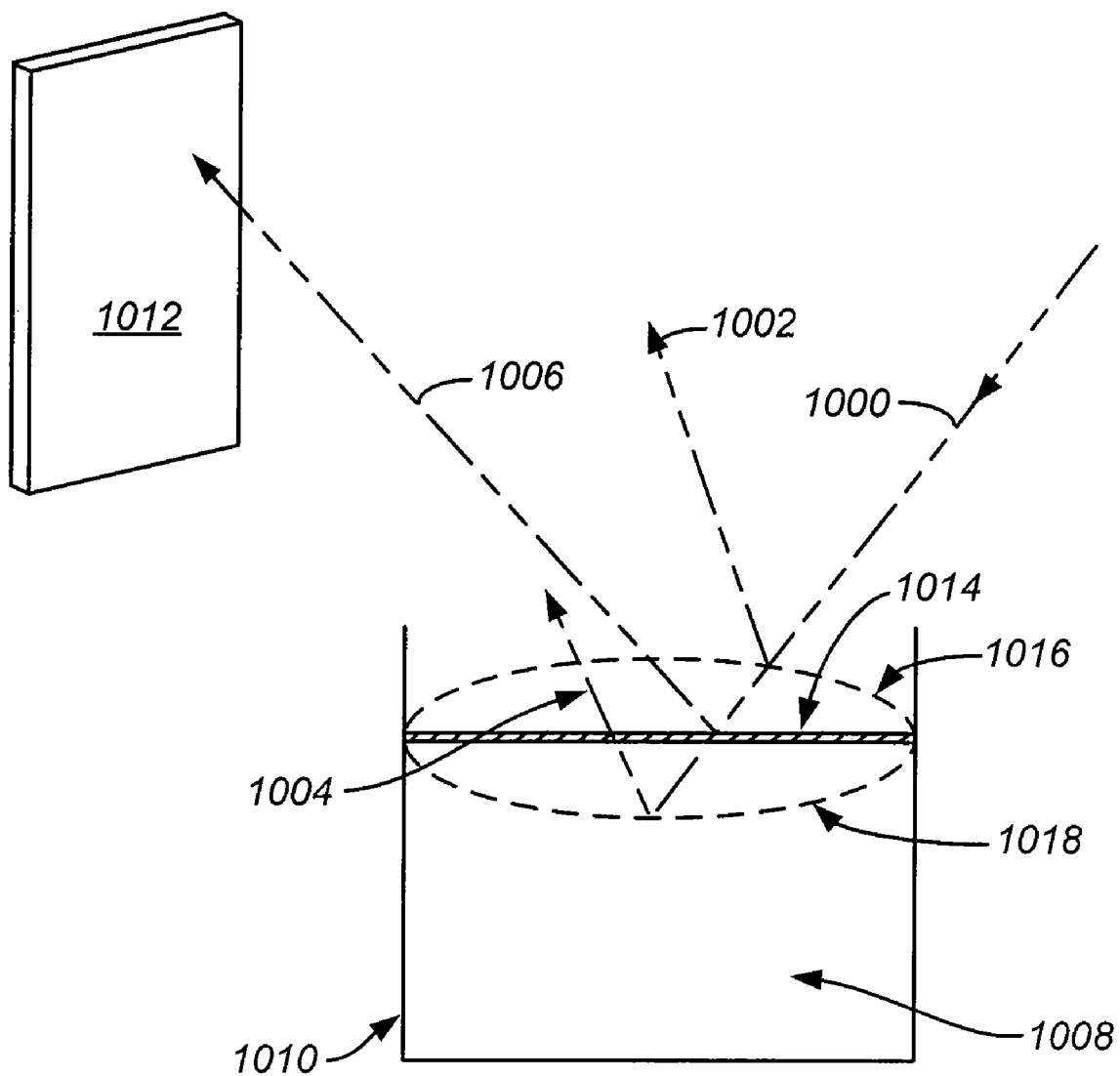
FIG. 10 shows a liquid or gel-based DLP system according to another embodiment of the invention.

FIG. 10 shows an L/G-DLP system according to another embodiment of the invention. Incident light beam 1000 is focused onto a reflective surface or coating 1014. Unlike the embodiments described above, instead of changing the curvature of a meniscus to change the direction of an incident beam, reflective surface or coating 1014 is itself adjusted to be made concave or convex. In particular, reflective surface or coating 1014 may be positioned in housing 1010 with gel or fluid 1008, so that the incident light beam 1000 is reflected onto screen 1012. When reflective surface or coating 1014 is made convex as shown in 1016, incident light beam 1000 is reflected away from screen 1012, as indicated by beam 1002. Likewise, when reflective surface or coating 1014 is made concave as shown in 1018, incident light beam 1000 is also reflected away from screen 1012, as indicated by beam 1004. The curvature of reflective surface or coating 1014 may be changed by means of electro-wetting, actuation, or any other means that enable the incident light beam to be reflected in a direction away from screen 1012.

Since the embodiments described above use the phenomenon of 'total internal reflection' or 'refraction' or 'reflection' to control and manipulate light, the need for movable micro-mirrors is eliminated. Several advantages are realized by this. For example, eliminating mechanical parts automatically eliminates significant causes of performance failure in DLP chips, such as stuck mirrors and damaged hinges for rotating the micro-mirrors.

Another improvement provided by L/G-DLP devices over conventional micro-mirror arrays is the elimination or minimization of the pixel effect. By manipulating the curvature of the liquid or gel meniscus, the stray spots of light could be made to smear on the projection screen, and produce a smoother picture and improve the overall picture quality.

Yet another advantage provided by L/G-DLP devices is the improved facility of thermal management. Since there are no pivoted components in embodiments of the invention, thermal conduction throughout the chip is improved by the use of liquid or gel cooling, instead of air cooling as for devices with arrays of movable micro-mirrors.

Moreover, since a lesser number of fabrication steps is required for the L/G-DLP system, the required fabrication process is simpler. Accordingly, a higher yield is expected, with lower production costs for the batch fabrication process. Additionally, automation in processing is increased since the liquid/gel-based digital processing system reduces the amount of hand-processed steps.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. For example, various possible arrangements of L/G-DLP pixel arrays exist and the embodiments are not limited to the ones described herein. Moreover, those skilled in the art will appreciate that the same techniques can apply to other types of fluids and materials, or other types of devices such as analog light processors. Therefore, the scope of the appended claims should be accorded the broadest interpretation so as to encompass all such modifications and similar arrangements.

What is claimed is:

1. A device for light processing comprising:
   a first housing having a reflective bottom surface and side walls defining a first cavity;
   a first fluid or gel having a meniscus disposed within the first cavity; and
   a first control means coupled with the first fluid or gel for adjusting a curvature of the meniscus; and
   wherein the bottom surface is configured to reflect an incident light beam through the first fluid or gel and toward the meniscus; and
   wherein adjusting the curvature to above a critical curvature causes the meniscus of the first fluid or gel to deflect the reflected incident light to the bottom surface or the side walls of the cavity.

2. The device of claim 1 wherein adjusting the curvature to below a critical curvature allows the reflected incident light to refract onto a surface outside of the housing.

3. The device of claim 1 wherein the reflected incident light refracts onto a surface outside of the housing when the device is in the "on" position.

4. The device of claim 1 wherein the reflected incident light deflects to the bottom surface or the side walls of the cavity when the device is in the "off" position.

5. The device of claim 1 wherein the control means includes an actuator.

6. The device of claim 1 wherein the control means includes an electro-wetting means.

7. The device of claim 1 wherein the control means includes a piezoelectric actuator.

8. The device of claim 1 wherein the housing includes a top surface and wherein the top surface has a non-reflective coating.

9. The device of claim 1 wherein the housing includes a top surface and wherein the top surface does not have a non-reflective coating.

10. The device of claim 1 further comprising a hydrophobic material covering a surface of the walls above the meniscus of the first fluid or gel.

11. The device of claim 10 wherein the hydrophobic material includes a material selected from the group consisting of Teflon, CYTOP, zirconium oxynitride, polymers, ceramics, alloys or any other hydrophobic materials.

12. The device of claim 1 further comprising:
   a second housing having a reflective bottom surface and side walls defining a second cavity;
   a second fluid or gel having a meniscus disposed within the second cavity; and
   a second control means coupled with the second fluid or gel for adjusting the curvature of the meniscus; and
   wherein the bottom surface is configured to reflect the incident light beam through the second fluid or gel and toward the meniscus.

13. The device of claim 1 wherein the cavity is coupled with a channel that is further coupled with a fluid or gel reservoir.

14. The device of claim 1 wherein the fluid or gel includes a liquid.

15. The device of claim 1 wherein the fluid or gel includes a polymer.

16. The device of claim 1, wherein the light processor is a digital light processor.

17. The device of claim 1, wherein the light processor is an analog light processor.

18. A device comprising:
   a plurality of cavities, each having side walls and a reflective bottom surface;
   a fluid or gel having a meniscus disposed within each cavity; and
   a control means coupled with the fluid or gel for adjusting a curvature of the meniscus disposed within each cavity;
   wherein the bottom surface is configured to reflect an incident light beam through the fluid or gel and onto an outside surface; and
   wherein adjusting the curvature to above a critical curvature selectively causes the meniscus disposed within each cavity to deflect the reflected incident light beam to the bottom surface or the side walls of the cavity.

19. The device of claim 18 wherein the plurality of cavities is provided by porous silicon.

20. The device of claim 19 wherein each cavity has a diameter of about 5 µm.

21. The device of claim 18 wherein the plurality of cavities is coupled with a multi-channel structure that is further coupled with a fluid or gel reservoir.

22. The device of claim 18 wherein each cavity represents a pixel in a light processor.

23. The device of claim 18 wherein the outside surface is a display screen.

24. The device of claim 18 further coupled with an electronic feedback system that allows real-time focusing.

25. A method of manipulating light comprising:
- providing a fluid or gel within a housing that includes a cavity, wherein the fluid or gel forms a meniscus disposed within the cavity;
- focusing an incident light beam to the bottom surface of the cavity, wherein the light beam reflects from the bottom surface to the meniscus; and
- adjusting a curvature of the meniscus so that the light refracts out of the cavity or reflects into the cavity;
- wherein adjusting the curvature of the meniscus so that light refracting out of the cavity occurs when the curvature remains below a critical curvature.

26. The method of claim 25 wherein adjusting the curvature of the meniscus so that light reflecting into the cavity occurs when the curvature exceeds a critical curvature, wherein the incident light beam forms an incident angle that is larger than a critical angle for total internal reflection.

27. The method of claim 25 wherein adjusting the curvature of the meniscus occurs by changing the pressure applied on the fluid or gel.

28. The method of claim 25 wherein adjusting the curvature of the meniscus occurs by electro-wetting.

29. A method of manipulating light in a light processor without movable mirrors comprising:
- providing a fluid or gel within a housing that includes a reflective bottom surface and a cavity, wherein the fluid or gel forms a meniscus disposed within the cavity;
- focusing an incident light beam to the bottom surface of the cavity; and
- adjusting a curvature of the meniscus to manipulate the reflection of incident light;
- wherein adjusting the curvature of the meniscus includes adjusting the curvature of the meniscus to remain below a critical curvature so that the light beam refracts to outside the cavity.

30. The method of claim 29 wherein adjusting includes adjusting the curvature of the meniscus to exceed a critical curvature so that the light beam deflects back into the cavity.

31. The method of claim 29 wherein adjusting includes adjusting the curvature of the meniscus to remain below a critical curvature so that a pixel of light turns on.

32. The method of claim 29 wherein adjusting includes adjusting the curvature of the meniscus to exceed a critical curvature so that a pixel of light turns off.

33. A device for light processing comprising:
- a first housing having a reflective bottom surface and non-reflective side walls defining a first cavity;
- a first electro-active or conductive material having a meniscus disposed within the first cavity; and
- a first control means coupled with the first electro-active or conductive material for adjusting a curvature of the meniscus; and
- wherein the bottom surface is configured to reflect an incident light beam through the first electro-active or conductive material and toward the meniscus.

34. The device of claim 33 wherein the electro-active or conductive material includes a fluid.

35. The device of claim 33 wherein the electro-active or conductive material includes a gel.

36. The device of claim 33 wherein adjusting the curvature to above a critical curvature causes the meniscus of the first electro-active or conductive material to deflect the reflected incident light to the bottom surface or the side walls of the cavity.

37. The device of claim 33 wherein adjusting the curvature to below a critical curvature allows the reflected incident light to refract onto a surface outside of the housing.

38. The device of claim 33 wherein the control means is a power source coupled with the electro-active or conductive material to apply a voltage on the electro-active or conductive material.

39. The device of claim 33 further comprising a hydrophobic dielectric material covering the walls of the cavity.

40. The device of claim 39, wherein the curvature of the meniscus is adjusted by changing a contact angle formed by the electro-active or conductive material with the dielectric material on the walls of the cavity.

* * * * *